Dec. 9, 1930.  M. P. E. HOHN  1,784,443
CIGARETTE MAKING MACHINE
Filed Dec. 19, 1927  2 Sheets-Sheet 1
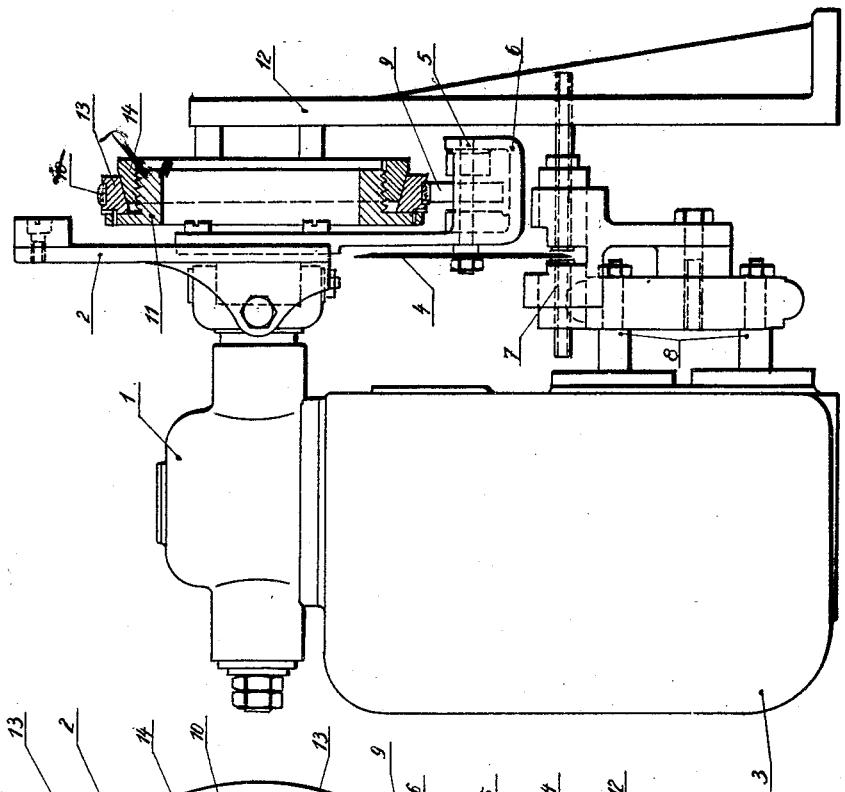
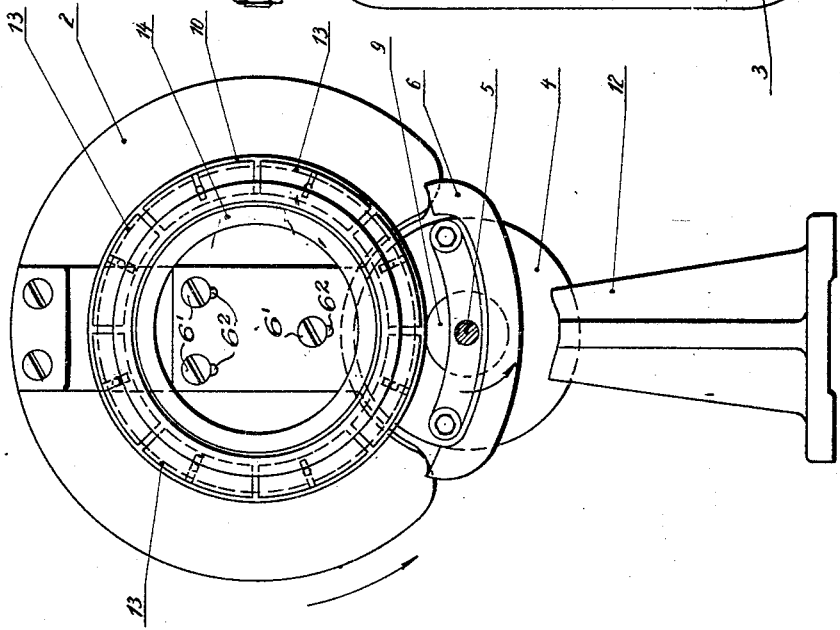

Dec. 9, 1930.  M. P. E. HOHN  1,784,443
CIGARETTE MAKING MACHINE
Filed Dec. 19, 1927  2 Sheets-Sheet 2
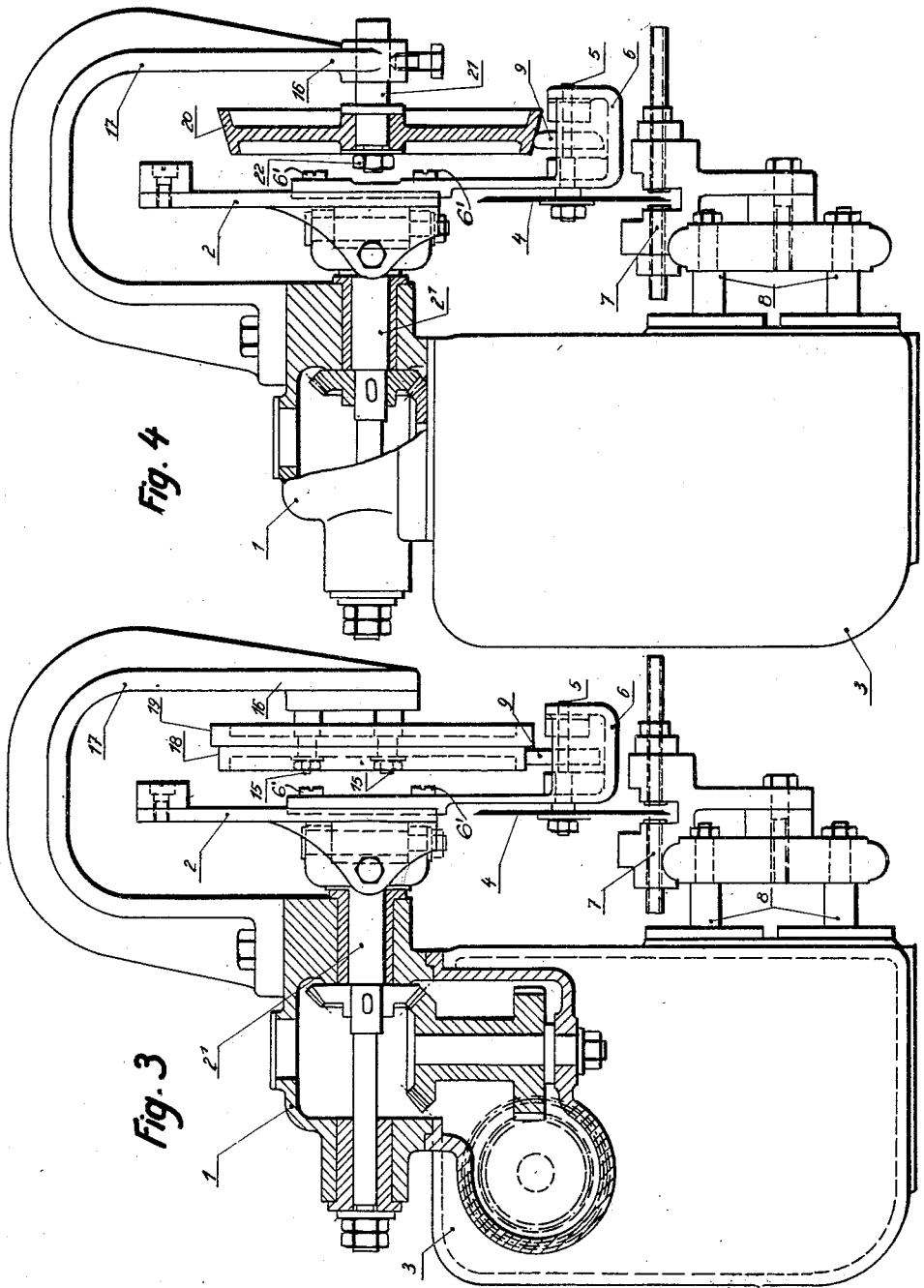

Patented Dec. 9, 1930

1,784,443

UNITED STATES PATENT OFFICE

MAX PAUL ERNST HOHN, OF DRESDEN, GERMANY, ASSIGNOR TO THE FIRM "UNI-VERSELLE" CIGARETTENMASCHINEN-FABRIK J. C. MULLER & CO., OF DRESDEN, GERMANY

CIGARETTE-MAKING MACHINE

Application filed December 19, 1927, Serial No. 241,183, and in Germany November 21, 1927.

According to the proposal of the applicant in the German patent application U. 9882 III/79b a circular cutter is mounted on a vibrating rotating support outside the axis of rotation of the same, i. e. so as to revolve with a planet motion. The circular cutter must have a rotary motion imparted to it, i. e. it must not only revolve with its support about the axis of rotation of the latter, but must rotate about its own axis. With this object in view the circular cutter is mounted on a shaft which is capable of being driven.

Although the cord drive previously proposed by the applicant works in practice, it appears to be preferable to drive the cutter shaft by pure wheel gearing without the interposition of a cord which is subject to variations in length and the like, since the cutter shaft may have to run at speeds considerably exceeding 5,000 revolutions.

Although the cutter blade is mounted on a vibrating rotating support outside the axis of rotation of the latter, it must be remembered, that each point of the support and of all parts carried by it performs a pure rotary motion. Only as regards points following one another, such for instance as points on the cutting edge of the circular cutter, which follow one another, is the vibrating motion of importance.

When, in accordance with the present invention, a driving wheel is mounted on the shaft of the circular cutter and is in engagement with a friction wheel having fixed bearings, there is theoretically only one point of contact between the friction wheel and the driving wheel. This point of the driving wheel, however, describes a pure circle, so that the friction wheel may be made in the form of a fixed circular disc, along the periphery of which the driving wheel simply rolls, if the wheel be mounted concentrically to the axis of rotation of the vibrating support. In order that the engagement with the friction wheel may be maintained, the diameter of the circular cutter varying, and the shaft of the same having to be adjusted on the vibrating support, the friction wheel must be capable of being adjusted to a corresponding extent.

For this purpose the friction wheel may for instance be made of radially adjustable segments, over which a ring of extensible material, for instance rubber or the like, is placed, on which the driving wheel runs. By radially adjusting the segments, the diameter of the friction wheel may be increased or diminished so as to adapt it to all positions of the cutter shaft on the vibrating support.

A simpler method is to make the periphery of the friction wheel conical and to mount the wheel on its shaft so as to be capable of being longitudinally displaced and fixed in position. By this means, by simply sliding the friction wheel longitudinally, that part of the friction wheel, which co-acts with the driving wheel of the same, will be adjusted as regards its diameter.

In the accompanying drawing several constructional examples of the new apparatus are shown.

Figs. 1 and 2 show in front and side elevation a constructional form in which the friction wheel is composed of radially adjustable segments.

Fig. 3 is a vertical longitudinal section through an arrangement in which the friction wheel has the form of a stepped wheel.

Fig. 4 represents, also in vertical longitudinal section, a constructional form in which the friction wheel is conical at its periphery.

Referring to the constructional form shown in Figs. 1 and 2, the rotary shaft of the rotating vibrating support 2 is journalled in the bearing 1. The drive is provided by driving means housed in the casing 3. The vibrating disc 2 supports the circular cutter 4, the shaft 5 of which is journalled in the bearing 6 mounted on the vibrating disc.

The circular cutter cuts the continuous rod of cigarette tobacco which is guided in the cutting tube 7 of known construction. The cutting tube is supported by the ends of the bars 8 which project from the casing 3 and are slid longitudinally to a suitable extent by the driving means housed in the casing.

On the cutter shaft 5 the driving wheel 9 is mounted which is in engagement with the peripheral part of a friction wheel, which consists of a rubber ring 10. The friction wheel consists of a fixed core 11 which is mounted on the bracket 12 of the casing in such a manner that the friction wheel is concentric with the rotatable shaft of the vibrating support, journalled in the bearing 1. The extensible rubber ring 10 is supported by the segments 13 which are mounted so as to be capable of being slid radially on the core piece 11. The radial displacement is effected by means of a conical ring 14 which is capable of being longitudinally displaced or screwed on the circular hub of the core piece 11. The hub is provided with an external thread and the conical ring with an internal thread so that, by screwing the conical ring forwards or backwards, the ring may be axially displaced and the segments 13 thereby forced outwardly or withdrawn inwardly.

Should the cutter shaft 5 be displaced radially on the vibrating support 2 towards the outside or inside in accordance with the varying diameter of the cutter disc 4, and which can be accomplished in any well known manner, for instance by fastening screws 6' through slotted openings 6² in the member 6, the friction wheel can follow this displacement so that the driving wheel 9 is always in frictional engagement with the friction wheel.

In the constructional form shown in Fig. 3 there is, as in the previous example, the bearing 1 with the shaft 2' of the vibrating disc 2 journalled therein, the driving parts being housed in the casing 3. There is also the circular cutter 4 on the shaft 5 journalled in the bearing 6, the cutting tube 7, the bars 8, and, mounted on the shaft 5 of the circular cutter, the driving wheel 9. The latter, however, is in engagement with a stepped wheel which is fixed by means of screws 15 to the end 16 of a bow 17 which is supported by the bearing 1. The stepped wheel is fixed to the bow 17 in such a manner that it is concentric with the shaft 2' of the vibrating disc 2. The stepped wheel has two steps 18 and 19.

With the two parts in the relative positions shown in Fig. 3, the driving wheel 9 is in engagement with the stepped wheel 18. On the cutter shaft 5 being displaced radially outwards on the vibrating support 2, when the diameter of the cutter disc 4 becomes smaller, the stepped wheel is reversed, so that the step 19 takes the place of the step 18. The wheel 9 will then be in engagement with the step 19.

For increasing the frictional effect, either the stepped wheel may be provided with a friction coating or the driving wheel 9 itself may be provided with a rubber rim, for instance, with a pneumatic rubber tire.

In the constructional example shown in Fig. 4 the driving wheel 9 is in engagement with a conical friction wheel 20 which is mounted on central shaft 21 so as to be capable of sliding axially thereon and of being fixed by means of the screw 22. The driving wheel 9 provided with a rubber rim runs on the periphery of the cone 20 along a circular path in spite of the vibrating motion of the support 2, and in a plane at right angles to the shaft 21. When the shaft 5 of the circular cutter 4 is displaced radially, this displacement may be allowed for by simply sliding the conical friction wheel 20 longitudinally on its shaft 21.

In all the above cases the plane of the driving wheel 9 coincides with the plane in which the point of contact with the friction wheel travels in a circle about the shaft of the vibrating cutter support.

What I claim is:

1. A cutting device for cigarette making machines of the continuous rod type, comprising in combination a rotary cutter shaft, a driving wheel mounted on the said shaft, a rotating vibrating support for the cutter shaft, a stationary friction wheel so mounted as to be concentric with the axis of rotation of said support and capable of entering into engagement with the said driving wheel, whereby the rotary motion of the cutter shaft is produced by the said driving wheel rolling around the said friction wheel, means for radially adjusting the cutter shaft on the said support for allowing for a change in diameter of the cutter and means for adjusting the friction wheel for making up for the adjustment of the cutter shaft, as and for the purpose set forth.

2. A cutting device for cigarette making machines of the continuous rod type, comprising in combination a rotary cutter shaft, a driving wheel mounted on the said shaft, a rotating vibrating support for the cutter shaft, a stationary friction wheel so mounted as to be concentric with the axis of rotation of the said support and having a conical rim with which it is capable of entering into engagement with the said driving wheel, whereby the rotary motion of the cutter shaft is produced by the said driving wheel rolling around the said friction wheel, and means for adjusting the said friction wheel axially, as and for the purpose set forth.

3. A cutting device for cigarette machines of the continuous rod type comprising a rotatable support, means to drive said support, a rotatable cutter mounted on said support, means for adjusting the position of said cutter on said support and adjustable means for continuously driving said cutter while said first named means is actuated.

4. A cutting device for cigarette machines of the continuous rod type comprising a rotatable vibrating support, means to drive said support, a rotatable cutter mounted on said support, means for adjusting the radial position of said cutter on said support and adjustable means for continuously driving said cutter while said first named means is actuated.

In testimony whereof I have signed my name to this specification.

MAX PAUL ERNST HOHN.